United States Patent Office 3,245,493
Patented Apr. 12, 1966

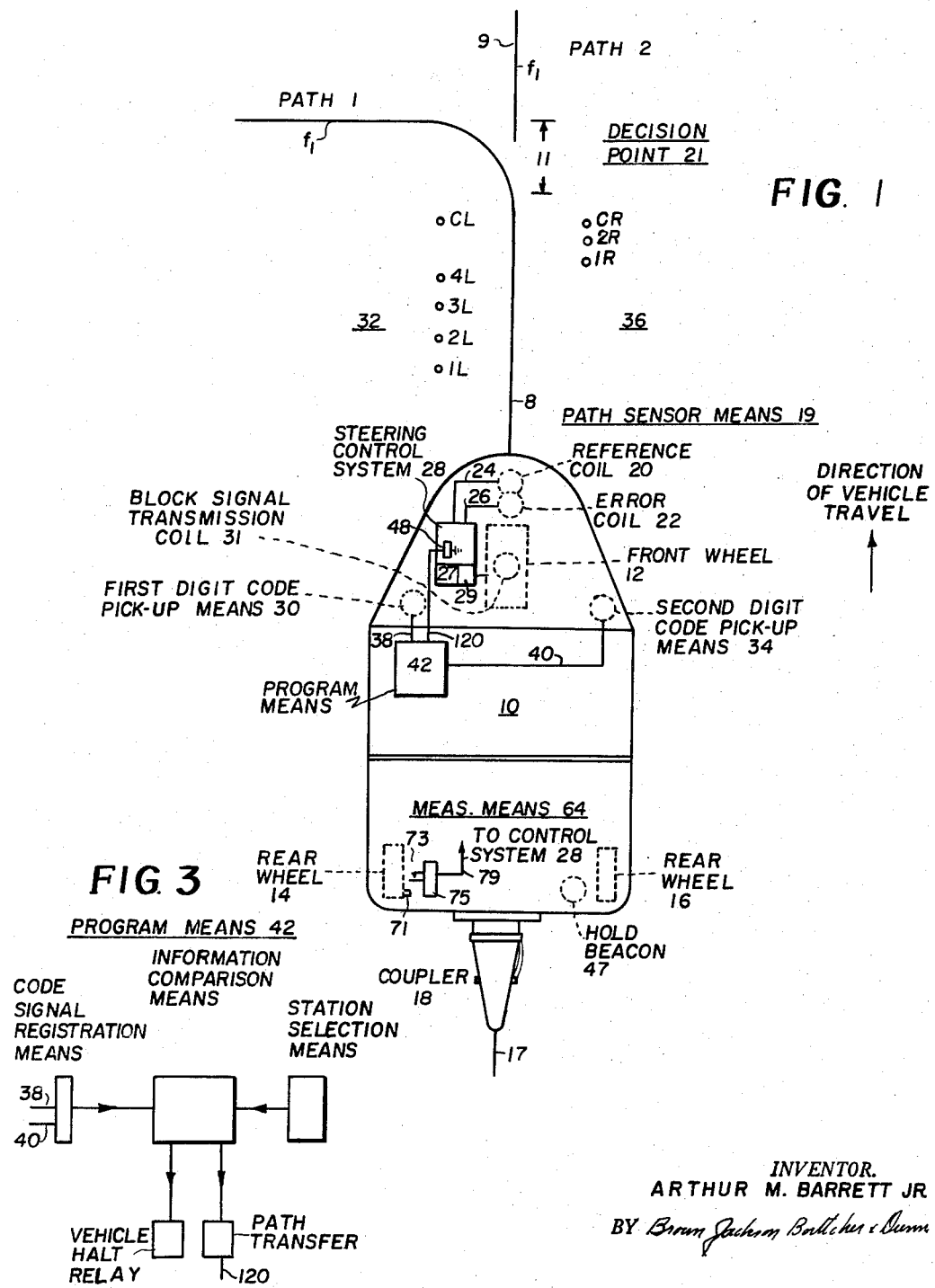

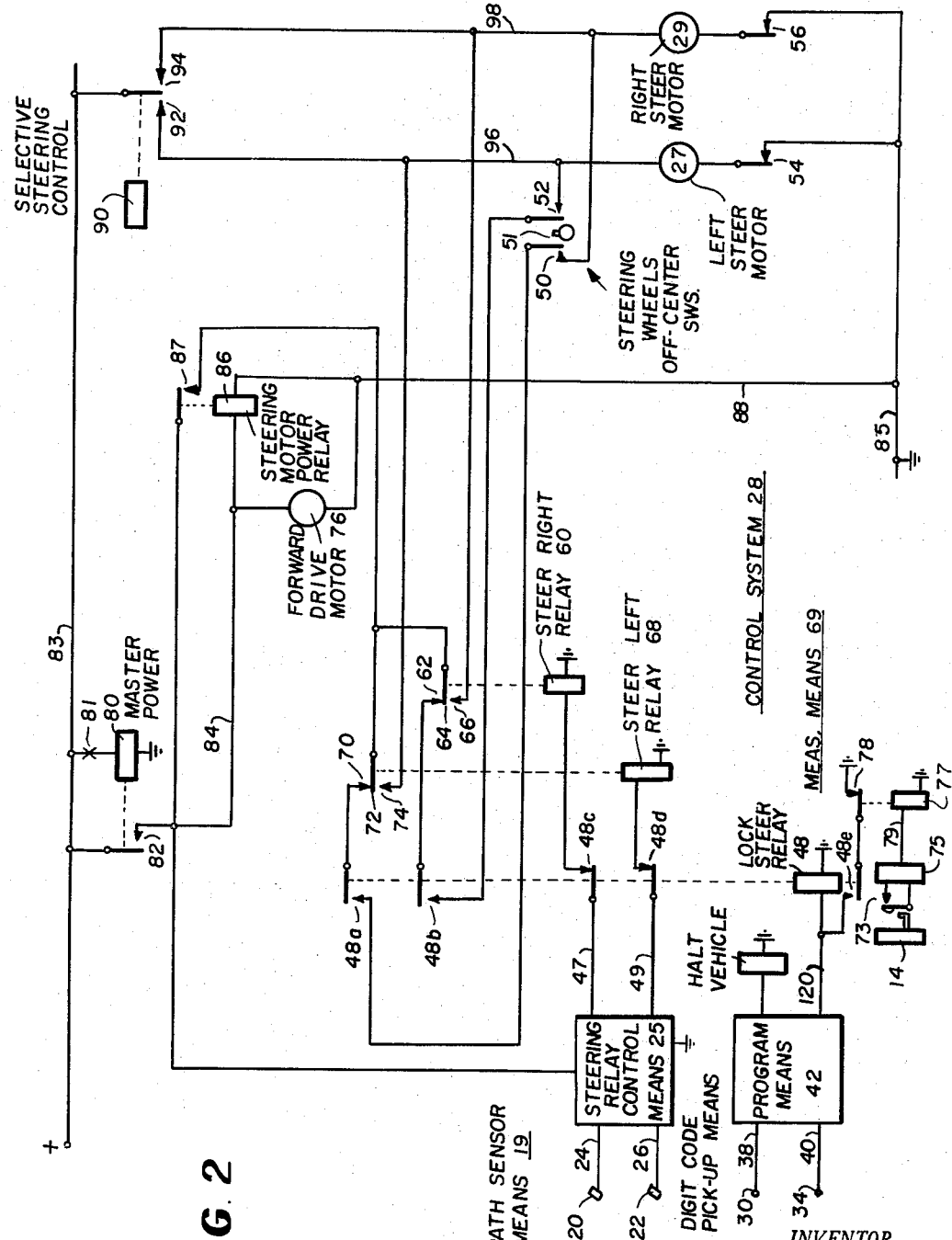

3,245,493
AUTOMATIC CONTROL SYSTEM FOR VEHICLES
Arthur M. Barrett, Jr., Northbrook, Ill., assignor to Barrett Electronics Corporation, Northbrook, Ill., a corporation of Illinois
Filed Mar. 26, 1964, Ser. No. 354,948
15 Claims. (Cl. 180—82)

The present invention is directed to a novel guidance system, and more particularly to an improvement in a guidance system in which at least one mobile vehicle is guided along a traffic path to arrive at a predetermined location within a traffic layout.

Novel arrangements in which a traffic path has been used in the guidance of a mobile unit along a desired course have been set forth in U.S. Patent No. 3,009,525, which issued to Robert De Liban, and in the copending application of Robert De Liban, Serial No. 81,313, entitled Guidance Systems, filed January 9, 1961, and now Patent No. 3,147,817. Such disclosures set forth structures and circuit which move and guide a driverless mobile vehicle, such as a battery powered truck, along a predetermined course. In such disclosures the path is defined by a conductor energized to radiate an electromagnetic field, and sensing means on the vehicle are operative to detect the radiated energy and to control the truck steering means to follow such path. The path may also comprise a strip of radioactive material which may be detected by radiation detection means on the vehicle, a simple painted line which may be detected by an optical unit, a steel strip which may be detected by a magnet member, and other similar arrangements.

In one novel system disclosed in the copending application, a plurality of driverless trucks equipped with sensing means are operative to simultaneously follow energized conductor paths in a safe and reliable manner. In such arrangement, station selection means provided on each truck are selectively operable to instruct the vehicle to proceed to any one of a plurality of stations located at different points along the path.

Location-identification means at each station provide a unique code signal for its associated station. Code sensing means on the vehicle detect the code provided by the location-identification means as the vehicle approaches a station, and code signal registration means carried on the vehicle are operative responsive to the receipt of the code signal to transmit the position information to information comparison means on the vehicle.

The information comparison means compare the station registered on the station selection means with the position information provided by the code sensing means, and issue a control signal for the vehicle which is dependent upon the location of the vehicle in the system and the relative location of the selected station. If the vehicle has arrived at the station selected, the comparison means issue a halt signal for the vehicle. If the information indicates that the station is other than the desired station, the comparison means will not issue a signal, and the vehicle continues along the path.

The system shown in the copending application includes a main traffic path and a plurality of secondary paths which branch away from the main path at different points designated as decision points. That is, whenever the vehicle arrives at a decision point in the system, it must select one of at least two alternate paths as a preferred path to a selected station. Each decision point includes an associated location-identification means, each of which provides a unique code for its associated decision point. The code sensing means on the vehicle detect such code as the vehicle approaches the decision point, and the comparison means automatically control the vehicle to follow the one of the paths which is predetermined as the preferred path from the decision point to the selected station.

The main path in such system was energized by signals of frequency $f1$, and the secondary paths were energized by frequency $f2$. In controlling the vehicle to follow the one of the paths which comprises the preferred path from a desired point to the selected station, the comparison means on the vehicle were operative to selectively effect enablement of either a first frequency sensing circuit ($f1$), or a second frequency sensing circuit ($f2$) on the vehicle depending upon the particular path which was to be followed from such point.

Although such arrangement was satisfactory and successful in the field, the use of two different frequency paths manifestly requires an additional amount of equipment. By way of example, as a minimum, it is necessary to divide the paths into two groups and to provide two different frequency transmitters for the different paths. Further, it is necessary to provide duplicate sensing circuits on each of the vehicles (which in some systems may be in the order of fifty units) as well as additional control equipment for selectively enabling the alternative ones of the frequency responsive devices on the vehicles. Thus, the use of two or more frequencies in addition to being a more complex system, is more costly.

It is an object of the present invention, therefore, to provide a novel control system in which the vehicles have means operative responsive to coded signals to control the vehicle to follow the preferred path of a group of paths extending from a decision point, each of the paths extending from such decision point being energized by the same frequency signal.

It will be further apparent that in systems using other forms of guide paths, such as for example, magnetic steel guide lines, painted strips and the like, it is even more difficult to provide distinguishing characteristics for the different paths which extend from a decision point in a system. Since large installations will normally include a number of decision points, the use of steel guide paths, optical guide paths and the like in the larger systems has been heretofore seriously limited.

It is yet another object of the present invention therefore to provide a novel system of such type in which each station and decision point has unique code signals, and the path defining characteristics for each of a plurality of paths extending from a decision point are the same, and in which each vehicle has means which are operative responsive to the unique code signals received at the decision point to select a preferred path of several paths extending therefrom, and means operative in response to such selection to control the vehicle to follow the preferred path even though each of the paths extending therefrom has the same path defining characteristics.

It is a further specific object of the present invention to provide a vehicle having code sensing means for obtaining code information from a location-identification means which is disposed at a decision point, code signal registration means on the vehicle for receiving such information, information comparison means on the vehicle operative at each decision point along the path to compare the location of the vehicle as indicated by the coded location-identification information with the station destination of the vehicle, and to issue a control signal which identifies the preferred path of a plurality of paths which extend from the decision point, and means on the vehicle for controlling the vehicle to follow the preferred path of the plurality of paths, even though each path extending from the decision point has the same path defining characteristics.

It is a specific object of the present invention to provide novel means on a vehicle in such type system which are normally operative to control the vehicle to follow a first path from a decision point, and means operative, at times, responsive to receipt of the unique identification signal for the decision point to control the vehicle to follow a second path including a first means responsive to said signal to lock the steering means to follow a linear path from the point of signal receipt independent of the path defining characteristics of either path at such point.

It is a further object of the invention to provide a guided vehicle in such type system having novel means which are operative responsive to receipt of the unique code signal for the decision point to, at times, control the vehicle steering means to steer a linear path from such point, and measuring means for maintaining said steering means in said mode for a predetermined measured interval of distance.

It is another object of the invention to provide a guided vehicle in such type system having novel means which are, at times, operative responsive to receipt of the unique code signal at a decision point to disable the sensing means which sense the guide path, and to control the vehicle steering means to steer a linear path from such point, and measuring means operative after movement of the vehicle over a predetermined measured interval of distance to terminate steering in such mode.

Features of the present invention which are believed to be novel are set forth with particularity in the appended claims. The invention itself together with further objects and advantages thereof may be best understood by reference to the following description taken in connection with the accompanying drawings in which:

FIGURE 1 is a plan view of a mobile unit indicating the disposition thereon of certain of the signal sensors which are used in the basic guidance system of the present arrangement;

FIGURE 2 is a circuit diagram which depicts an operating circuit for controlling a mobile vehicle in accordance with the novel teaching of the invention; and FIGURE 3 is a block diagram of the program means for the vehicle which are set forth in detail in the above identified application.

GENERAL DESCRIPTION

In the arrangement shown in FIGURE 1A of the copending application, the traffic layout includes a main traffic path which is energized by a first frequency $f1$, and a plurality of secondary traffic paths which branch off from the main path (as for example secondary path 28 which branches off at decision point 21) which are energized by a second frequency signal $f2$. Each decision point includes location identification means which identify the associated decision point by a unique code signal. A number of stations, such as 7, are located at a plurality of different points on the layout at which use of the trucks is desired. Each station likewise includes location identification means for identifying its own station with a unique code.

As shown in FIGURE 3 herein, associated station selection means on the vehicle permit selection of the station destination desired for a truck. As the truck moves along the course, code signal registration means on the truck are operative at each station to receive the unique code of each station or decision point, and information comparison means compare the station destination provided by the station selection means with the location in the system as indicated by the unique code signal received thereat. If the selected station has been reached, the information comparison means effect halting of the truck by operating vehicle halt relay. If not, the truck continues along the path.

At certain points in the system, such as decision point 21, shown in FIGURE 1 herein, the truck will have the option of moving along one of several available paths. Information comparison means on the truck use the unique code signal of the decision point to determine which of the paths is the preferred path from decision point to the selected station, and automatically control the truck to follow such path. In the prior arrangement the control means on the truck select a path by enabling the particular frequency responsive circuit on the truck which is tuned to the path to be followed from the decision point. Stated briefly, if the main path is to be followed, the sensor means tuned to frequency $f1$ are enabled. If a secondary path is to be followed, the sensor means tuned to frequency $f2$ are enabled.

In the present disclosure, all of the paths in the system are energized by the same frequency signal. As a vehicle reaches a decision point, such as point 21 on a first path, and the control means determine the first path is the preferred path from the decision point to the station selected, the sensor means continue to follow the first path. However, if the control means indicate a second path is the preferred path from the decision point, novel means on the truck disable control of the vehicle by the steering control means including the path sensor means, and effect the enablement of auxiliary control means for the truck steering means to control the truck to follow a course determined by the auxiliary control means independent of any guide path signals. Such mode of operation is continued for a measured length which is predetermined to move the vehicle out of the influence of the first path, and into the influence of the second path. The novel manner in which such operation is effected is now set forth.

With reference now to FIGURE 1 there is shown thereat a plan view of a mobile vehicle 10 including the components thereon which are important to the disclosure of the present invention. In the position shown, the vehicle 10 is approaching a decision point, such as 21, in a system layout such as that shown in the copending application. The present arrangement differs from such arrangement in that paths 1 and 2 which extend from the decision point 21 are energized by signals of the same frequency ($f1$). Path 1 comprises the same conductor 8 which turns to the left at the decision point 21, and path 2 comprises a second guide conductor 9 physically separated from conductor 8 by a space increment 11.

As will be shown, if the equipment on vehicle 10 determines that the preferred course extends along path 1, the vehicle continues to sense the signal output of path 8 and no adjustment in the responsive means on the vehicle is required. If the vehicle determines that the preferred route extends along path 2 from decision point 21, the novel means on the vehicle are operative to discontinue control of the steering means by the path sensing equipment, and enable a lock-steer circuit which controls the vehicle 10 to advance along a straight line for the measured interval 11 to bring the path sensor means into the zone of influence of the signals on path 9. After travel of the vehicle for the predetermined distance, the lock-steer equipment on the vehicle is disabled, and the path sensor means once more control the steering means in advancement of the vehicle along path 2.

With reference to FIGURE 1, the vehicle 10 as there shown includes a front drive and steering wheel 12, left and right rear wheels 14 and 16, and a coupler 18 attached to the rear of the truck. Path sensor means 19 includes a reference coil 20 and an error coil 22 centrally mounted at the forward end of the vehicle 10 which are operative in the manner of the disclosure in the copending application to detect or sense the frequency signals provided by a guide path, such as 8, and to couple the resultant signals over conductors 24, 26 to steering control system 28 which in turn controls associated steering motors 27, 29 in the adjustment of the front wheel 12 to cause the vehicle 10 to follow path 8. The specific manner of operation of the sensor means 19 and steering control circuitry 28 is set forth in detail in the above identified copending De Liban application.

In units adapted for use in systems having block signalling of the type set forth in such application, a block transmission coil 31 is positioned at the forward end of the truck 10 to radiate a presence signal over the block loop in which the vehicle is located. The block loop extends the signal backward to a beacon in the block immediately behind the first truck. A hold beacon coil 47 disposed on the right rear of each vehicle detects a presence signal transmitted by a beacon signalling means of such type, and is operative to effect halting of the truck whenever a signal is received from the hold beacon as the result of another truck being in the block ahead.

As the vehicle moves adjacent a station or a decision point, such as 21, a pair of digit code pickup means 30, 34 obtain system location information for the vehicle from location identification means, such as 32, 36 which are located at each of the stations and decision points in the system. In the arrangement set forth in the copending application, the location identification means are provided at each point by extending the guide wire 8 itself in the form of conduction loops to either side of the path, the number and disposition of such loops providing a unique position-indicating code signal at the different stations and decision points in the system. As shown in FIGURE 1, the code signal provided at the decision point 21 is comprised of a first (tens) digit "4" code devices, a second (units) digit "2" code devices, and a readout signal.

Digit code pickup means on the vehicle 10 in such embodiment comprise frequency sensitive coils 30, 34 mounted on the vehicle to operatively detect the loops 32, 36 as the vehicle 10 proceeds along path 8.

Thus, it will be apparent that as the vehicle 10 advances along path 1 defined by conductor 8, first digit pickup means 30 will pass over code devices 1L–4L to effect the transmission of four successive pulses over conductor 38 to program means 42. With continued travel of the vehicle 10, the second digit pickup coil 34 will pass over the code identification devices 1R–2R and two pulses will be transmitted over conductor 40 to program means 42. Shortly thereafter, coils 30 and 34 will simultaneously pass over command readout loops CL, CR and simultaneous pulses over conductors 38, 40 effect readout in the program means 42 for the purpose of identifying the location of the truck in the system to the program equipment.

In another embodiment used in the field, the location identification means comprised small magnets inserted in the floor in lieu of the guide wire loops, and the code pickup coils 30, 34 were replaced by glass encapsulated reed relays. In use, as the vehicle 10 proceeds along path 8 and the first reed relay is moved over the magnet members 1L–4L, the relay operates four times to transmit four pulses over conductor 38 to program means 42. In a similar manner the second reed relay is moved over magnet 1R, 2R, and the relay operates twice to transmit two pulses over conductor 40 to program means 42. Readout is effected as both relays are advanced over magnet CL, CR.

Comparison means in the program means 42 compare the position of the vehicle in the system with the destination stored in the selection means. If the comparison means ascertain that the vehicle 10 has reached the selected station in the system, the vehicle 10 is halted. If the vehicle is at a decision point, the comparison means determine the preferred route from such point to the selected station.

Thus if the preferred route to the selected station lies over path 1, there will be no change in the output of the program means to the steering control system, and the path sensor means 19 will control the truck 10 to proceed along path 1 as defined by conductor 8. In the event that the shorter route lies over the path 2, then the comparison means in program means 42 provides an output signal over conductor 120 to the lock steer relay 48.

As relay 48 operates, it is effective (a) to complete a self-holding circuit controlled by measuring means 69, (b) to disable the control of the steering motors 27, 29 by the sensor means 19, and (c) to move the steering wheel 12 to its center position, whereby the truck 10 will be caused to move in a straight line across increment 11 toward path 2 as defined by conductor 9.

At the time lock-steer relay 48 operates to initiate travel of the truck 10 over increment 11, measuring means 69 on the rear truck wheel 14 initiate measurement of a predetermined increment of travel (usually one to two feet). In one embodiment measuring means 69 included four projecting lugs, such as illustrated lug 71, and a microswitch 73 which is closed each time a lug 71 is moved into engagement therewith. A stepping switch 75 is connected to advance one step for each operation of microswitch 73. As the vehicle advances over the predetermined increment sufficient to move the vehicle out of the influence of guide path 1 and into the influence of guide path 2, the rotating lugs 71 advance the stepping switch 73 to its signal terminal. In one embodiment the stepping switch was wired at its fourth terminal, and accordingly a measured increment signal was provided after one revolution of the rear wheel 14 in which each of the four lugs 71 operated the microswitch 73 once. In another embodiment the stepper switch was wired at its eleventh terminal whereby approximately three revolutions of wheel 14 were required to advance the stepping switch 75 to its signal terminal. As will be shown, the signal output of stepper switch 75 results in the deenergization of the lock-steer relay 48, which restores, and reconnects control of the steering motors 27, 29 to steering control system 28 and sensing means 19. At this time, the sensing means 19 will be within the range of influence of the signals radiated by conductor 9, and via conductors 24, 26 will energize steering control system 28 to control motors 27, 29 in accordance with the signals detected on conductor 9 (path 2).

The specific circuitry 28 for effecting such manner of control is set forth in detail in FIGURE 2 and is now described hereat.

CONTROL SYSTEM 28

As shown in the lower left hand corner of FIGURE 2 the path sensing means 19 includes reference coil 20 and error coil 22 which are connected over input conductors 24, 26 respectively to steering relay control means 25 in steering control system 28, one specific embodiment of such circuitry being shown in FIGURE 14 of the patent to De Liban 3,009,525, which issued November 21, 1961.

As further shown in FIGURE 2, the output of steering relay control means 25 is operative to control a steer right relay 60 and a steer left relay 68 in accordance with the various signals detected as the vehicle 10 moves along a given path, such as path 1 defined by conductor 8. Steer right and steer left relays 60, 68 at their associated contacts 62–66 and 70–74 respectively, are operative to selectively energize the right steer motor 29 or the left steer motor 27, each of which is connected to rotate the front wheel 12 in the direction indicated. It should be appreciated that the left and right steer motors 27, 29 can be combined into a single electrical unit, but for purposes of the present explanation it is convenient to illustrate the two steering motors as individual elements.

The energizing source for steering control system 28 comprises positive and negative conductors 83, 85 respectively which may be connected to the plus and minus terminals of a conventional direct-current truck battery. A manual start switch 81 may be connected to control an energizing circuit for master power relay 80, which at its contacts 82 extends direct current power (a) to the forward drive motor 76 for the vehicle 10, (b) to the steering motor power relay 86, and (c) to the steering relay control means 25.

Steering motor power relay 86 at its contacts 87 extends power to the control contacts of the steer right and steer left relays 60, 68 for use in selectively energizing the steer left, steer right motors 27, 29. The energizing circuits for the steering motors 27, 29 are also controlled by contacts 48a, 48b of lock steer relay 48, and a pair of off-center switches 50, 52 associated with the front steering wheel 12. A pair of limit switches 54, 56 are also provided in the circuits for left steer, right steer motors 27, 29 to prevent the steering wheel 12 of the vehicle 10 from being turned through too great an angle in either direction.

Lock steer relay 48 is selectively enabled by program means 42 whenever the circuitry including digit code pickup means 30, 34 ascertains that the preferred path is a straight path (such as path 2 in FIGURE 1). Lock steer relay 48 is operative at its contacts 48c, 48d, at such times, to disconnect sensor means 19 and steering relay control means 25 from steer right, steer left relays 60, 68.

STEERING CONTROL SYSTEM

The manner in which the novel control circuitry of the invention is effective to control the vehicle in following a selected one of a plurality of paths from a decision point in the system is now set forth in detail.

With the closure of manual switch 81, master power relay 80 operates and at its contacts 82 (a) completes an obvious circuit for the steer relay control circuit 25, (b) completes an energizing circuit for steering motor power relay 86 and forward drive motor 76, which circuit extends from source positive conductor 83 over contacts 82, conductor 84, the parallel circuit including forward drive motor 76 and steering motor power relay 86, and conductor 88 to the negative supply conductor 85. Forward drive motor 76 operates to propel the vehicle in a forward direction, and simultaneously steering motor power relay 86 at its contacts 87 extends the power on conductor 83 over contacts 82 and contacts 87 to the control contacts 62–66 on the steer right relay 60, and the control contacts 70–74 on steer left relay 68 for use by such relays in controlling the operation of the left, right "steer" motors 27, 29.

More specifically, if the vehicle is moving along the path defined by the guide conductor 8 (FIGURE 1) the coils 20, 22 of sensor means 19 will provide a balanced signal over conductors 24, 26 to steering relay control means 25, and the output of steering relay control 25 over conductors 47, 49 is zero. Steer right relay 66 and steer left relay 68 respectively will accordingly be inoperative and no adjustment of the steering wheel 12 is necessary.

In the event that the vehicle moves toward the left of the path, the sensing units 20 and 22 will control steering relay means 25 to operate in the manner of the teaching of the above identified application, and an energizing signal is transmitted over conductor 47 and contacts 48c to the steer right relay 60. As steer right relay 60 operates, it is effective at its contacts 64, 66 to complete an operating circuit from source conductor 83 to the right steering motor 29 to energize same, and thereby turn the front wheel 12 in the direction of the guide wire 8, the circuit for the right "steer" motor 29 extending from the power conductor 83 over contacts 82, 87, 64, 66, conductor 98, right steer motor 29 and limit switch 56 to the negative source conductor 85. When the vehicle is returned to the path defined by the guide conductor 8, the signal output of the sensing units 20 and 22 to steering relay control circuit 25 is reduced to zero, whereby steer right relay 60 restores and at its contacts 64, 66 interrupts the operating circuit for the right steer motor 29.

In a similar manner, as the vehicle is displaced to the right of the path, coil means 20, 22 of sensor means 19 and steering relay control means 25 couple an energizing signal over conductor 49 and contacts 48d to steer left relay 68. As relay 68 operates, it is effective at its contacts 72, 74 to complete an operating circuit for the left steer motor 27 to rotate the front wheel toward the left, and thereby steer the vehicle back toward the desired path, the operating circuit extending from the positive conductor 83 over contacts 82, 87, 72, 74, conductor 96, left steer motor 27, limit contacts 54 and negative conductor 85. The vehicle 10 is thus propelled along the path 8, the path sensing coils 20, 22 detecting the signals provided by guide wire 8 and controlling left, right steer motors 27, 29 in the guidance of the mobile until along such course. This manner of guidance is disclosed in more detail in the above identified copending application.

Assuming now that the vehicle moves to a decision point, such as decision point 21 shown in FIGURE 1, and the vehicle 10 advances over the location identification means 32, the digit code pickup means 30 on vehicle 10 provides four pulses over conductor 38 to program means 42, and as the vehicle moves over location identification means 36, the pickup means 34 on vehicle 10 provides two pulses over conductor 40 to program means 42.

Comparison means (not shown) in program means 42 operate in the manner set forth in the copending application to determine the position of the vehicle in the system as indicated by the location identification means 32, 36 and thereupon program means 42 determine the preferred path from the decision point to the selected station.

In the present embodiment, if the program means 42 ascertain that the vehicle should follow path 1, there is an absence of a signal on conductor 120 and lock steer relay 48 remains inoperative. Accordingly, sensor means 19 and steering relay control means 25 control steer right relay 60 and steer left relay 68 in the operation of left steer, right steer motors 27, 29 to adjust the front steering wheel 12 in such manner as to move the vehicle along a first path (defined by conductor 8) as it turns away from decision point 21.

Alternatively, if the program means 42 determine that the preferred route lies over the second path defined by conductor 9, a signal will be transmitted over conductor 120 and relay 48 to ground.

Lock steer relay 48 operates and at its contacts 48e locks to ground over contacts 78 in the control circuit of measuring means 69; at its contacts 48c, 48d interrupts the control circuits for steer right relay 29 and steer left relay 27, whereby any signals detected by sensor means 19 and provided by steering relay control means 25 in response thereto, will be ineffective. Simultaneously, lock steer relay 48 at its contacts 48a, 48b extends an energizing circuit over off-center switches 50, 52 to the right steering motor 60 and left steering motor 58. Whenever the front steering wheel 12 is in its center position, as illustrated, off-center switches 50, 52 remain open and the vehicle 10 proceeds along a straight course. However, in the event that the wheel 12 should tend to drift to the left or right, cam 51 which rotates with steering wheel 12 operates a corresponding one of the off-center switches 50, 52 (depending upon the direction of drift) to actuate the proper one of the steering motors 27, 29 to correct the deviation. Thus, if the front wheel 12 drifts to the right, cam 51 rotates to close off-center switch 52 and thereby complete an operating circuit from the positive supply conductor 83 over contacts 82, 87, 62, 48b, off-center switch 52, the left steer motor 27 and limit switch 54 to the negative conductor 85. Left steer motor 27 rotates the steering wheel 12 toward the left and back to its mid position, whereby off-center contacts 52 open and interrupt the energizing circuit for left steer motor 27.

In a similar manner, in the event that the steering wheel 12 is angularly displaced toward the left of its center position, off-center switch 50 will close to complete an energizing circuit for the right steel motor 29, the circuit extending from positive conductor 83 over contacts 82, 87, 70, 48a, off-center switch 50, the right steer motor 29 and limit switch 56 to the negative conductor 90. As the right steer motor 29 operates to return the steering wheel 12 to its mid position, the off-center switch 50 opens to deenergize the right steer motor 29.

Thus, off-center switches 50, 52 as enabled by lock steer relay 48 maintain the front steering wheel 12 of the vehicle 10 in its center position during the period that transfer from one path to another occurs, and the vehicle is controlled to advance along a substantially straight lines from one path to the other at a decision point. In such advancement, each of the four lugs 71 in succession move into contact with microswitch 73 and stepper switch 75 is advanced four steps. Assuming that the measured increment 11 is to be transversed after one revolution of the wheel 14, the stepper switch 75 will be wired at its fourth step terminal to provide a signal over conductor 79 to relay 77 which operates, and at its contacts 78 interrupts the energizing circuit for the lock steer relay 48 to effect the restoration thereof.

With the restoration of lock steer relay 48, contacts 48a, 48b open the enabling circuit controlled by the off-center switches 50, 52, whereby the switches will be ineffective in the further control of the left, right steer motors 27, 29. Simultaneously, lock steer relay 48 at its contacts 48c, 48d reconnects the steer right relay 60 and steer left relay 68 to the output of the steering relay control means 25 whereby sensor means 19, and control means 25 control the operation of the steer right relay 60, steer left relay 68 in the operation of the steering motors 27, 29 in the manner heretofore described to control the vehicle to follow the second path defined by conductor 9.

Selective steering control means comprise a manually operable switch (not shown) or relay 90 having contact sets 92, 94 may be provided to permit selective manual control of the left or right steering motors 27, 29 from the power conductors 83, 85 in an obvious manner.

SUMMARY

The novel control means set forth hereinabove, in addition to being more reliable and less complex, are particularly well suited for use with any of the installations which use different forms of guide paths. That is, although the present disclosure sets forth in detail the manner in which transfer is provided from a first energized conductor guide path to a second conductor guide path energized by the same signal, it will be readily apparent that the same control system including the lock steer means and measuring means may be used with systems in which the paths are defined by steel strips, painted lines and the like.

While what is described is regarded to be a preferred embodiment of the invention, it will be apparent that variations, rearrangements, modifications and changes may be made therein without departing from the scope of the present invention as defined by the appended claims.

What is claimed is:

1. In a guidance system, a traffic layout including path defining means for defining a plurality of guide paths which extend between a plurality of stations and at least one decision point in said traffic layout at which a plurality of paths diverge from each other, location-identification means for providing a unique code for said decision point and each of said stations, at least one mobile unit including steering means, path sensor means for sensing said guide paths, and steering control means connected to said path sensor means for controlling said steering means to follow said guide paths, program means including selection means for selecting a station destination, means for receiving the unique code signal at each station and said decision point, comparison means for comparing said station destination with the vehicle location indicated by the received code signal including means for determining the preferred route from said decision point to the selected station, and auxiliary steering control means on said vehicle selectively operated by program means including means effective with each operation of said auxiliary control means to control said steering means to steer only a linear course from said decision point independent of any path defining means located thereat.

2. In a guidance system, a traffic layout including path defining means for defining a plurality of guide paths which extend between a plurality of stations, and at least one decision point in said traffic layout at which a plurality of paths diverge from each other, location-identification means for providing a unique code for said decision point and each of said stations, at least one mobile unit including steering means, path sensor means for sensing said guide paths, and steering control means controlled by said sensor means to steer said vehicle along said paths, program means including selection means for selecting a station destination, means for detecting the unique code signal at each station and said decision point, comparison means for comparing said station destination with the vehicle location indicated by said code signal including program means for determining the preferred route from said decision point to the selected station, and auxiliary steering control means on said vehicle including lock steer means selectively operated by said program means, means responsive to each operation of said lock steer means to interrupt the control of said steering means by said steering control means and centering means, responsive to each operation of said lock steer means to control said steering means to steer only a linear course from said decision point independent of the path defining means located thereat.

3. A guidance system as set forth in claim 2 in which said steering means include a steering wheel having a mid position for controlling said vehicle to follow a linear course, and motor means for turning said steering wheel in different directions, and in which said centering means includes means to complete a circuit to said motor means to return said wheel to its mid-position with each displacement therefrom.

4. In a guidance system, a traffic layout including path defining means for defining a plurality of guide paths which extend between a plurality of stations, and at least one decision point in said traffic layout at which a plurality of paths diverge from each other, location-identification means for providing a unique code for said decision point and each of said stations, at least one mobile unit including steering means, path sensor means for sensing said path defining means, and a first steering control means controlled by said sensor means to steer said vehicle along said paths, program means including selection means for selecting a station destination, means for detecting the unique code signal at each station and said decision point, comparison means for comparing said station destination with the vehicle location indicated by said code signal including means for determining the preferred route from said decision point to the selected station, and auxiliary steering control means on said vehicle including a first means for disabling said first steering control means, a second means effective in each operation to control said steering means to steer only a linear course, and lock steer means selectively operated by said program means to simultaneously enable said first and second means.

5. In a guidance system, a traffic layout including path defining means for defining a plurality of guide paths which extend between a plurality of stations, and at least one decision point in said traffic layout at which a plurality of paths diverge from each other, location-identification means for providing a unique code for said decision point and each of said stations, at least one mobile unit including steering means, path sensor means for sensing said path defining means, and a first steering control means controlled by said sensor means to steer said vehicle along said paths, program means including selection means for selecting a station destination, means for detecting the unique code signal at each station and said decision point, comparison means for comparing said station destination with the vehicle location indicated by said code signal including program means for determining the preferred route from said decision point to the selected station, and auxiliary steering control means on said vehicle connected to said program means including means effective in each operation thereof by said program means to enable said steering means to steer only a linear course for a predetermined measured distance independent of the path defining means located thereat.

6. In a guidance system, a traffic layout including path defining means for defining a plurality of guide paths which extend between a plurality of stations, and at least one decision point in said traffic layout at which a plurality of paths diverge from each other, location-identification means for providing a unique code for said decision point and each of said stations, at least one mobile unit including steering means, path sensor means for sensing said path defining means, and a first steering control means controlled by said sensor means to steer said vehicle along said paths, program means including selection means for selecting a station destination, means for detecting the unique code signal at each station and said decision point, comparison means for comparing said station destination with the vehicle location indicated by said code signal including program means for determining the preferred route from said decision point to the selected station, and auxiliary steering control means on said vehicle including switch means selectively enabled by said program means, a first means effective with each operation of said switch means to interrupt control by said steering control means, a second means effective with each operation of said switch means to enable said steering means to steer only a linear path, measuring means for measuring a predetermined increment of movement of said vehicle on said linear path subsequent to interruption of said control, and means responsive to measurement of said predetermined increment by said measuring means to disable said switch means.

7. In a guidance system, a traffic layout including path defining means for defining a plurality of guide paths which extend between a plurality of stations, and at least one decision point in said traffic layout at which a plurality of paths diverge from each other, location-identification means for providing a unique code for said decision point and each of said stations, at least one mobile unit including control means having steering means, path sensor means for sensing said path defining means, and steering control means controlled by said path sensor means to steer said vehicle along said paths, program means including preselection means for selecting a station destination, means for detecting the unique code signal at each station and said decision point, comparison means for comparing said station destination with the vehicle location indicated by said code signal including program means for determing the preferred route from said decision point to the selected station, and auxiliary steering control means on said vehicle including a first means for disabling said first steering control means, and a second means effective in each operation thereof to control said steering means to steer only a linear course, and lock steer means selectively operated by said program means to enable said first and second means, measuring means for measuring a predetermined distance along said linear path, and means controlled by said measuring means to disable said lock steer means responsive to advancement of the vehicle along said linear course for said predetermined distance.

8. In a guidance system, a traffic layout including a plurality of stations, and a plurality of guide paths which extend between said stations, including at least one decision point at which a plurality of paths diverge from each other, and location-identification means for providing a unique code signal for said decision point, at least one mobile unit including control means having steering means for said vehicle, a first steering control means including means for sensing a guide path, and means for controlling said steering means to steer said vehicle along the sensed path, program means controlled by said unique code signal to automatically determine the preferred one of said paths from said decision point to any of a plurality of stations, and auxiliary steering control, including lock steer means selectively operated by said program means, and means responsive to each operation of said lock steer means to control said steering means to steer only a linear course independent of any guide paths located thereat.

9. In a guidance system, a traffic layout including a plurality of stations and a plurality of guide paths which extend between said stations, including at least one decision point at which a plurality of paths diverge from each other, location-identification means for providing a unique code signal for said decision point, at least one mobile unit including steering means, and a first steering control means for controlling said steering means to steer said vehicle along said paths route, means controlled by said code signal for automatically determining the preferred one of said paths from said decision point to a given station, and auxiliary steering control means on said vehicle including lock steer means selectively operative by said program means, a first means for disabling said first steering control means with each operation of said lock steer means, and a second means for thereupon controlling said steering means to steer only a linear course from said decision point with each operation of said lock steer means.

10. In a guidance system, a traffic layout including a plurality of stations and a plurality of guide paths which extend between said stations, including at least one decision point at which a plurality of paths diverge from each other, location-identification means for providing a unique code signal for said decision point, at least one mobile unit including steering means, a first steering control means for manually controlling said steering means to steer said vehicle along said paths, program means controlled by said code signal for automatically determining the preferred one of said paths from said decision point to a station, and auxiliary steering control means on said vehicle controlled by said program means including centering means effective in each operation thereof to control said steering means to steer only a linear course, and means including interval measuring means on said vehicle operative after a predetermined interval of movement along said linear path to terminate steering control by said centering means.

11. In a vehicle having steering means for use in a guidance system which includes at least one decision point at which a plurality of paths diverge from each other, and location-identification means for providing a unique code signal for said decision point, the improvement comprising a first steering control means having sensor means for detecting said guide path, and means for controlling said steering means to steer said vehicle along the detected path, program means controlled by said unique code signal to determine the preferred one of said paths from said decision point to any of a plurality of stations, and auxiliary steering control means responsive to selection of a predetermined one of said paths including means effective in each operation thereof by said program means to control said steering means to steer only a linear course from said decision point independent of the sensing of a guide path by said sensor means.

12. In a vehicle having steering means for use in a guidance system which includes at least one decision point at which a plurality of paths diverge from each other, and location-identification means for providing a unique code signal for said decision point, the improvement comprising a first steering control means for controlling said steering means to steer said vehicle along one of said paths, program means including switch means selectively operated by said program means controlled by said unique code signal to determine the preferred one of said paths from said decision point to any of a plurality of stations, auxiliary steering control means including a first means for disabling said first steering control means responsive to each operation of said switch means, and a second means for controlling said steering means to steer only a linear course from said decision point for each operation of said switch means.

13. In a vehicle having steering means for use in a guidance system including at least one decision point at which a plurality of paths diverge from each other, and location-identification means for providing a unique code signal for said decision point, the improvement comprising a first steering control means for controlling said steering means to steer said vehicle along one of said paths, program means controlled by said unique code signal to determine the preferred one of said paths from said decision point to any of a plurality of stations, auxiliary steering control means responsive to selection of a predetermined one of said paths including means effective with each operation thereof to control said steering means to steer only a linear course independent of said guide path, and measuring means for terminating steering control by said auxiliary steering control means after movement over a predetermined increment.

14. In a vehicle as set forth in claim 13 in which said measuring means include counter means, and means on a wheel of said vehicle for operating said counter means to advance one count for each predetermined increment of angular movement of said wheel, and means controlled by advancement of said counter means to a preselected count to disable said auxiliary steering control means.

15. In a vehicle having steering means which are adapted for use in a guidance system having at least one decision point at which a first path diverges from the decision point, and a second path spaced by an increment from said first path proceeding in a linear manner from said decision point, and location-identification means for providing a unique code signal for said decision point, the improvement comprising a first steering control means for controlling said steering means to steer said vehicle along one of said paths, program means controlled by said unique code signal to determine the preferred one of said paths from said decision point to any of a plurality of stations, said first steering control means controlling said steering means to follow said diverging path whenever said path is selected as the preferred path, and auxiliary steering control means enabled by said program means responsive to selection of a different predetermined one of said paths which extend from said decision point including means effective in each opeartion thereof to control said vehicle steering means to proceed only along a linear course over said space increment to said second path.

References Cited by the Examiner

UNITED STATES PATENTS

| | | | |
|---|---|---|---|
| 3,009,525 | 11/1961 | De Liban | 180—82 |
| 3,039,554 | 6/1962 | Hosking et al. | 180—77 |
| 3,147,817 | 9/1964 | De Liban | 180—82 |

BENJAMIN HERSH, *Primary Examiner.*

E. E. PORTER, *Assistant Examiner.*